(12) United States Patent
Chen (10) Patent No.: US 7,602,902 B2
(45) Date of Patent: Oct. 13, 2009

(54) METHOD AND APPARATUS FOR DECODING DTMF TONES

(75) Inventor: Hong-Jyh Chen, Woodbury, NY (US)

(73) Assignee: Honeywell International Inc., Morristown, NJ (US)

( * ) Notice: Subject to any disclaimer, the term of this patent is extended or adjusted under 35 U.S.C. 154(b) by 900 days.

(21) Appl. No.: 11/163,332

(22) Filed: Oct. 14, 2005

(65) Prior Publication Data

US 2007/0116242 A1 May 24, 2007

(51) Int. Cl.
*H04M 1/00* (2006.01)
(52) U.S. Cl. .................. 379/386; 379/282; 379/283; 379/284
(58) Field of Classification Search ............. 379/386, 379/282, 283.339, 284
See application file for complete search history.

(56) References Cited

U.S. PATENT DOCUMENTS

| 5,144,626 | A | * | 9/1992 | Funatsu et al. | ............... | 370/526 |
| 5,265,097 | A | * | 11/1993 | Funatsu et al. | ............... | 370/526 |
| 6,771,767 | B1 | * | 8/2004 | Li et al. | .................. | 379/386 |
| 2002/0038210 | A1 | * | 3/2002 | Yajima et al. | ............... | 704/230 |

* cited by examiner

Primary Examiner—Creighton Smith
(74) Attorney, Agent, or Firm—Dalia S. Grimberg; John Beninati; Robert S. Smith (57) ABSTRACT

A method for decoding a DTMF tone which includes collecting the width of serial signals by measuring the time interval between zero-crossing points within a predetermined time; counting within the predetermined time the number of signal zero-crossing points; performing interpolation on the data produced by the collecting and counting steps with a Fourier transform; identifying a first frequency that has the strongest magnitude from the resulting data; and calculating the lower frequency of the tone being decoded by subtracting the first frequency from the average frequency of the digitized signal. The invention also includes apparatus that utilizes a zero-crossing detector for receiving a DTMF tone to be decoded and producing a digitized output; apparatus for collecting the width of serial signals by measuring the time interval between zero-crossing points within a predetermined time; apparatus for counting within the predetermined time the number of signal zero-crossing points; apparatus for performing interpolation on the data produced by the collecting and counting steps with a Fourier transform; apparatus for identifying a first frequency that has the strongest magnitude from the resulting data; and apparatus for calculating the lower frequency of the tone being decoded by subtracting the first frequency from the average frequency of the digitized signal.

16 Claims, 6 Drawing Sheets

|  | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | * | 0 | # | D |

METHOD AND APPARATUS FOR DECODING DTMF TONES

BACKGROUND OF THE INVENTION

The invention relates to the use of audio tones to transmit data and particularly to decoding DTMF audio tones. Applications for this apparatus and method include telephony and other fields where data is transmitted by the use of audio tones. DTMF (Dual-tone Multi Frequency) is a tone composed of two sine waves of given frequencies. Individual frequencies are chosen so that it is quite easy to design frequency filters, and so that they can easily pass through telephone lines (where the maximum guaranteed bandwidth extends from about 300 Hz to 3.5 kHz). DTMF was not intended for data transfer; it is designed for control signals only. With standard decoders, it is possible to signal at a rate of about 10 "beeps" (=5 bytes) per second. DTMF standards specify 50 ms tone and 50 ms space duration. For shorter lengths, synchronization and timing are more difficult.

DTMF is the basis for voice communications control. Modern telephony uses DTMF to dial numbers, configure telephone exchanges (switchboards), and so on. Occasionally, simple floating codes are transmitted using DTMF— usually via a CB transceiver (27 MHz). It is used to transfer information between radio transceivers, in voice mail applications, etc. Almost any mobile (cellular) phone is able to generate DTMF after establishing connection. If a phone cannot generate DTMF, a stand-alone "dialer" may be used. DTMF was designed so that it is possible to use acoustic transfer, and receive the codes using standard microphone.

Figure 4:
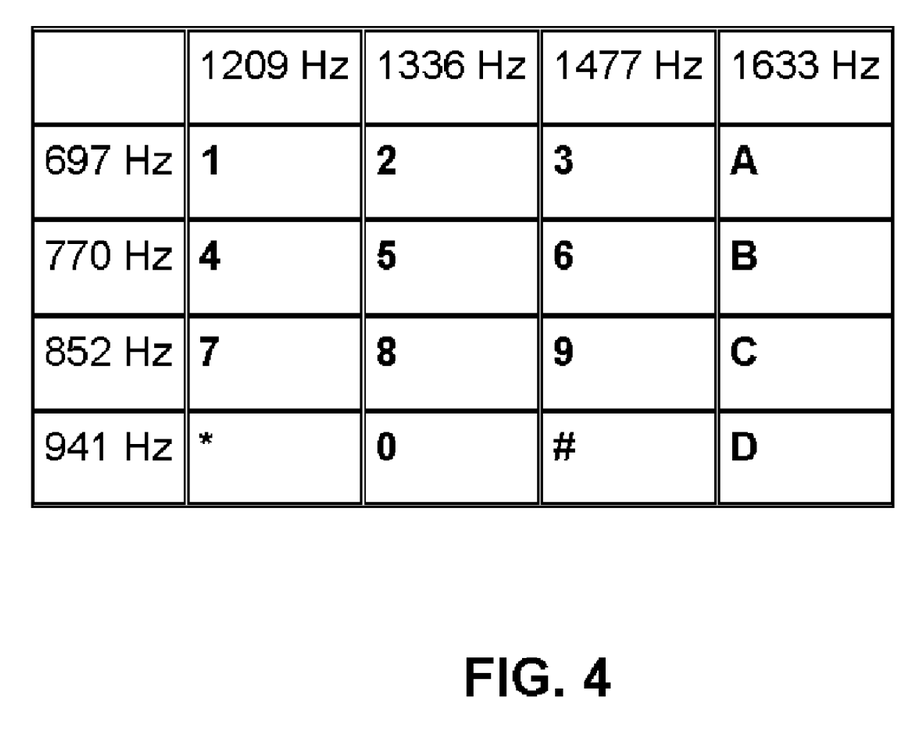
FIG. 4 is a table listing the two simultaneous frequencies that are mixed together for each key of a keypad.

The table in FIG. 4 shows how to compose any DTMF code. Each code, or "beep", consists of two simultaneous frequencies mixed together (added amplitudes). Standards specify 0.7% typical and 1.5% maximum tolerance. The higher of the two frequencies may have higher amplitude (be "louder") of 4 dB max. This shift is called a "twist". If the twist is equal to 3 dB, the higher frequency is 3 dB louder. If the lower frequency is louder, the twist is negative. The X and Y coordinates of each code give the two frequencies that comprise the code.

Most often, dedicated telephony circuits are used to generate DTMF (for example, MT8880). On the other hand, a microprocessor can do it, too. Just connect a RC filter to two output pins, and generate correct tones via software. However, getting the correct frequencies often requires usage of a suitable crystal for the processor itself—at the cost of non-standard cycle length, etc. So, this method is used in simple applications only.

It is not easy to detect and recognize DTMF with satisfactory precision. Often, dedicated integrated circuits are used, although a functional solution for DTMF transmission and receiving by a microprocessor (a PIC in most cases) exists. It is rather complicated, so it is used only marginally. Most often, a MT 8870 or compatible circuit would be used. Most conventional decoders detect only the rising edges of the sine waves. So, DTMF generated by rectangular pulses and RC filters works reliably. The MT 8870 uses two 6th order band pass filters with switched capacitors. These produce nice clean sine waves even from distorted inputs and suppresses harmonics.

DTMF is used in security systems for both residential and commercial applications to remotely issue commands to security systems. For example, the commands may initiate a status report regarding a building in which the security system is installed. In other applications the commands may remotely turn on or off an entire system or individual features of a system.

In security panels (also known as alarm panels) used in residential and commercial security systems most design engineer who need the capability of decoding DTMF (Dual-tone-multi-frequency), have traditionally used an expensive DTMF decoding chip or a DSP with a costly A/D converter. The relatively expensive DTMF decoding chip or a DSP with a costly A/D converter constitutes a material part of the total cost of the security panel. Those skilled in the security industries art would not consider decoding DTMF by using a simple and cheap zero-crossing detector, because this type of detector will not carry over the analog property (amplitude) of original signals, which is the most essential factor for signals analysis.

SUMMARY OF THE INVENTION

It is an object to the present invention to provide apparatus and method which will accurately decode DTMF data.

A further object of the present invention is to utilize in apparatus and method which will preserve the amplitude of the original signals and thus permit additional signal analysis.

Another object of the present invention is to provide apparatus and method which will be less expensive than approach is used heretofore.

Still another object of the invention is to provide an inexpensive zero-crossing detector.

Yet another object of the invention is to reduce the cost of security panels.

It has now been found that these and other objects of the invention may be attained in a method for decoding a DTMF tone which includes collecting the width of serial signals by measuring the time interval between zero-crossing points within a predetermined time; counting within the predetermined time the number of signal zero-crossing points; performing interpolation on the data produced by the collecting and counting steps with a Fourier transform; identifying a first frequency that has the strongest magnitude from the resulting data; and calculating the lower frequency of the tone being decoded by subtracting the first frequency from the average frequency of the digitized signal.

In some forms of the method the collecting and counting steps utilizes a zero crossing detector to produce a digitized signal. Similarly, the performing interpolation step may be performed on the digitized signal from a zero crossing detector. The method may include sampling at a rate greater than twice the frequency of the highest frequency component of the signal. Some forms of the method may include providing a zero crossing detector to identify zero crossing point of an output.

The method may include providing a zero crossing detector to identify a zero crossing point of an output and more specifically, providing a detector that includes a comparator.

The invention also includes the method as described and further utilizing the decoded DTMF tone to operate a security system. The method may include utilizing the decoded DTMF tone to control a security system.

The invention also includes apparatus that utilizes a zero-crossing detector for receiving a DTMF tone to be decoded and producing a digitized output; apparatus for collecting the width of serial signals by measuring the time interval between zero-crossing points within a predetermined time; apparatus for counting within the predetermined time the number of signal zero-crossing points; apparatus for performing interpolation on the data produced by the collecting and counting steps with a Fourier transform; apparatus for identifying a first frequency that has the strongest magnitude from the resulting data; and apparatus for calculating the lower frequency of the tone being decoded by subtracting the first frequency from the average frequency of the digitized signal.

Some forms of the apparatus include apparatus for sampling at a rate greater than twice the frequency of the highest frequency component of the signal. The zero crossing point detector may include a comparator. The apparatus may be part of a security system and, more specifically, a part of an alarm panel in a security system and may be used to control the security system in response to DTMF inputs directed to the security system.

The apparatus for collecting and the apparatus for counting as well has interpolation may include a microprocessor; memory; a data bus connecting the memory and the microprocessor. Such forms may also be part of a security system.

BRIEF DESCRIPTION OF THE DRAWING

The invention will better understood by reference to the accompanying drawing in which.

DESCRIPTION OF THE PREFERRED EMBODIMENTS

An understanding of the present invention requires an understanding of the Fourier Transform. See, for example, Ronald N. Bracewell, "The Fourier Transform," *Scientific American*, June 1989, pp. 86-95. The human ear automatically and involuntarily performs a calculation that takes the intellect years of mathematical education to accomplish. The ear formulates a transform by converting sound—the waves of pressure traveling over time and through the atmosphere—into a spectrum, a description of the sound as a series of volumes at distinct pitches. The brain then turns this information into perceived sound.

A similar conversion can be done using mathematical methods on the same sound waves or virtually any other fluctuating signal that varies with respect to time. The Fourier transform is the mathematical tool used to make this conversion. Simply stated, the Fourier transform converts waveform data in the time domain into the frequency domain. The Fourier transform accomplishes this by breaking down the original time-based waveform into a series of sinusoidal terms, each with a unique magnitude, frequency, and phase. This process, in effect, converts a waveform in the time domain that is difficult to describe mathematically into a more manageable series of sinusoidal functions that when added together, exactly reproduce the original waveform. Plotting the amplitude of each sinusoidal term versus its frequency creates a power spectrum, which is the response of the original waveform in the frequency domain.

The Fourier transform has become a powerful analytical tool in diverse fields of science. In some cases, the Fourier transform can provide a means of solving unwieldy equations that describe dynamic responses to electricity, heat or light. In other cases, it can identify the regular contributions to a fluctuating signal, thereby helping to make sense of observations in astronomy, medicine and chemistry. Perhaps because of its usefulness, the Fourier transform has been adapted for use on the personal computer. Algorithms have been developed to link the personal computer and its ability to evaluate large quantities of numbers with the Fourier transform to provide a personal computer-based solution to the representation of waveform data in the frequency domain.

Before computers, numerical calculation of a Fourier transform was a tremendously labor intensive task because such a large amount of arithmetic had to be performed with paper and pencil. These calculations became more practical as computers and programs were developed to implement new methods of Fourier analysis.

The present utilizes a Fourier transform to manipulate signals that have been digitized by a zero crossing detector, and to calculate the two frequencies that compose a given DTMF tone. The method and apparatus of the present invention are based on the two major characteristics of digitized signals: 1) the average frequency of digitized signals is equal to the higher one of two frequencies that compose a DTMF tone, due to the higher frequency is much louder than the lower one according to the DTMF specification 2) the width of portions of the respective waveforms of digitized signals is a function of the two frequencies that compose a DTMF tone.

A DTMF signal is one that consists of the sum of two sinusoids at frequencies selected from the tone table (See FIG. 4) to represent each key on a phone touch pad. There are 4 lower frequencies associated with the 4 rows of the tone table, and 4 higher frequencies associated with the 4 columns of the tone table. For example, the key '6', in DTMF, is represented with the sum of 770 Hz and 1477 Hz sinusoids.

Figure 1:
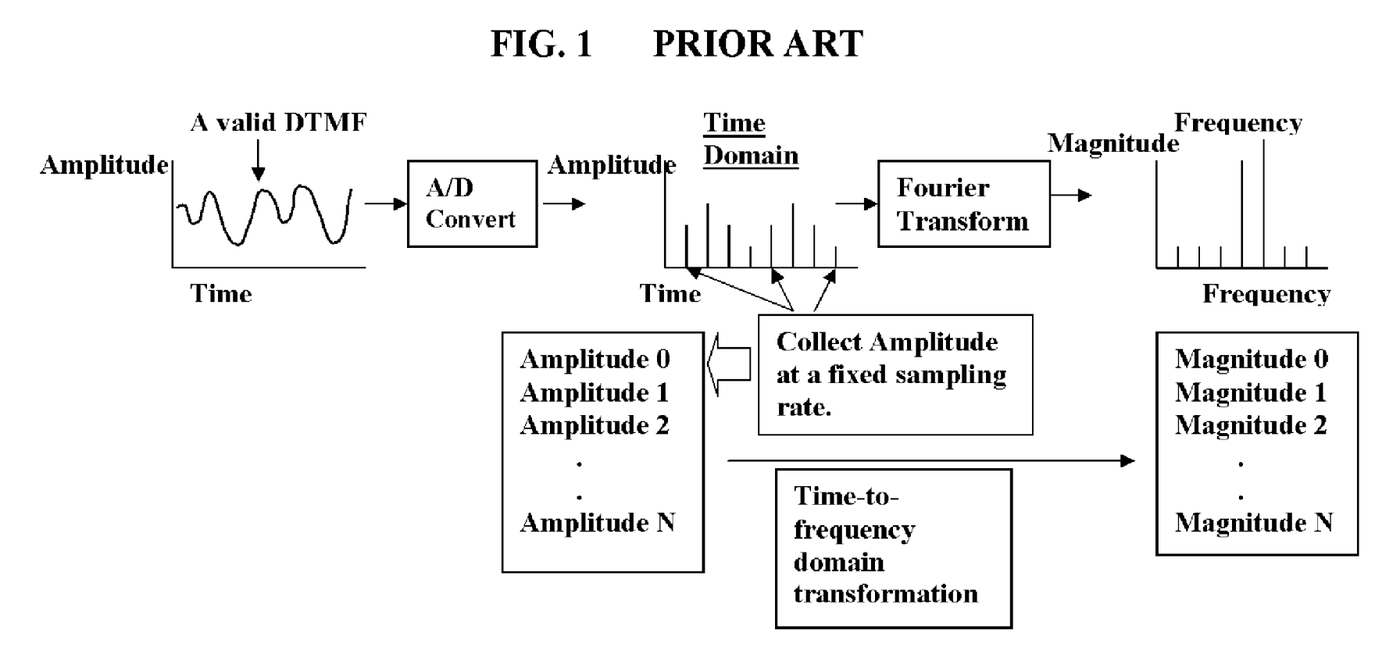
FIG. 1 is a diagrammatic view of the prior art DTMF decoding system.

A decoding algorithm must identify two frequencies that compose a given DTMF tone. Referring now to FIG. 1, the following is the typical prior art method to decode DTMF by using an A/D converter:

1) Collect a set of discrete data, amplitude of input signals, in serial by sampling the output of A/D converter at a fix sampling rate within a pre-determined period. This collected serial data is called a sequence of time-domain samples.

2) Perform interpolation on the time-domain sequence samples by employing the Fourier transform (the time-to-frequency domain transformation). The result is the set of magnitudes on the frequency-domain.

Figure 2:
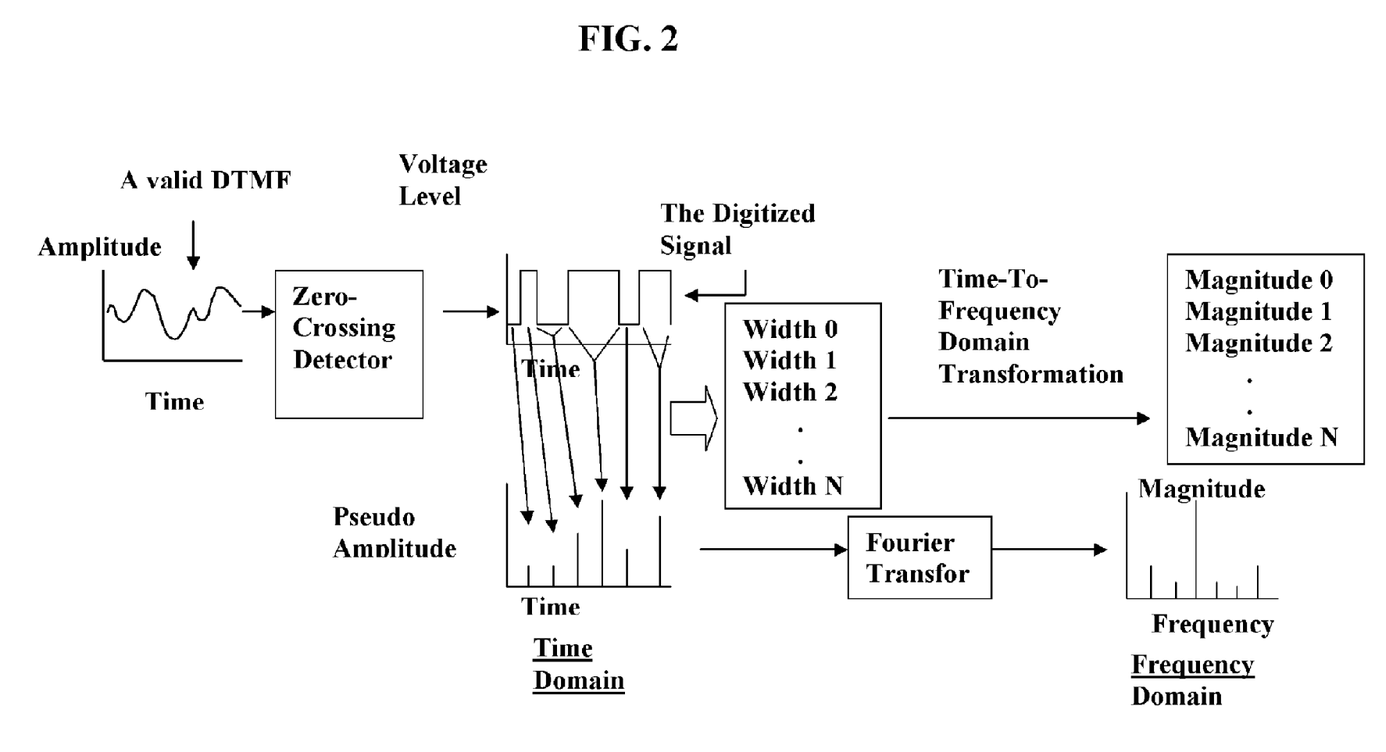
FIG. 2 is in a diagrammatic view of the DTMF decoding system in accordance with the present invention.
Figure 3:
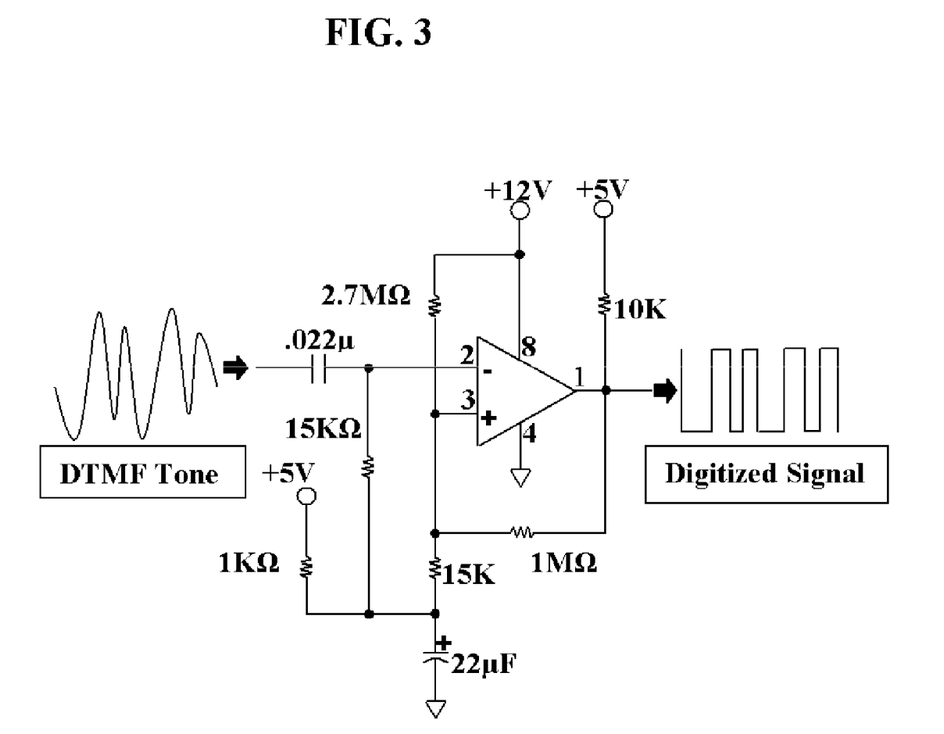
FIG. 3 is a diagrammatic view of one embodiment of a zero-crossing detector that incorporates an LM393 comparator in accordance with one form of the present invention.

3) Find two frequencies that have strongest magnitudes from the result data and use them to identity the touch key presented according to the tone table. Referring now to FIG. 2, there is shown a diagrammatic representation of the method in accordance with the present invention to decode DTMF by using a zero-crossing detector. FIG. 3 is a diagrammatic view of one embodiment of a zero-crossing detector that incorporates, in one embodiment of the present invention, a National LM393 low power low offset voltage dual comparator. A zero crossing detector is an electronic circuit that consists, in one form, of a comparator. The embodiment illustrated in FIG. 3 has an operational amplifier with an input voltage at its negative input. This is in contrast to known apparatus such as the zero crossing the threshold detector is illustrated and described at http://www.answers.com/topic/zero-crossing-threshold-detector. The zero crossing point is the point of choice for measuring phase and frequency. The reference is usually easy to establish and the signal's amplitude rate of change is a maximum at signal level of zero. The output stays at high voltage level when the input voltage is above the zero crossing point. The output stays at low voltage level when the input voltage is below the zero crossing point.

In a preferred form of the present invention the Fourier Transform utilized in the method and apparatus of the present invention is a Discrete Fourier Transform (DFT). The nature of the Discrete Fourier Transform will be better understood by reference to the following World Wide Web sites:

http://astronomy.swin.edu.au/~pbourke/other/dft  http://www.see.ed.ac.uk/~mjj/dspDemos/EE4/tutDFT.html The method in accordance with one embodiment of the present invention includes the following steps:

First, determinate a sample frequency (fs). The sampling interval is also called the sampling period. The sampling theorem (often called "Shannon's Sampling Theorem") states a continuous function f(t) is completely defined by samples every 1/fs (fs is the sample frequency) if the frequency spectrum F(f) is zero for f>fs/2. fs/2 is called the Nyquist frequency and places the limit on the minimum sampling frequency when digitizing a continuous a signal.

Second, collect a plurality of serial samples of amplitude of the input signal at the sampling interval.

The sampling of the output signal of the zero crossing detector by the above method, serial data contain only 1 or 0 (where 1 represents a high voltage level, 0 represents a low voltage level), which are useless for computing.

The method of the present invention includes:

The method in accordance with the present invention may be described by the following steps:

1) Collecting the width of serial signals by measuring the time interval between zero-crossing points within a pre-determined period.

2) Counting within the same predetermined time period how many zero-crossing points have been detected within the pre-determined period. Use this value to calculate the average frequency of the incoming digitized signal.

3) Thus, because the same predetermined time period is utilized the collection of width of serial signals corresponds to the sequence of time-domain samples.

4) The average frequency of the digitized signal is a half of frequency of the sampling rate used in DFT computing.

5) Performing interpolation on the sequence samples by employing the Fourier transform (the time-to-frequency domain transformation). The result is the set of magnitudes in the frequency-domain.

6) Identifying a frequency that has the strongest magnitude from the resulting data. For a valid DTMF tone, this frequency is the difference of two frequencies that compose DTMF tone.

7) Calculating the lower frequency by subtracting the frequency found in Step 4) from the average frequency of the digitized signal. Use these two frequencies to identity the touch key presented according to the tone table. According to DTMF specification, the higher frequency must be louder than the lower frequency. It results the average frequency of digitized signal approximately equal to the higher frequency of the incoming DTMF tone.

Figure 5:
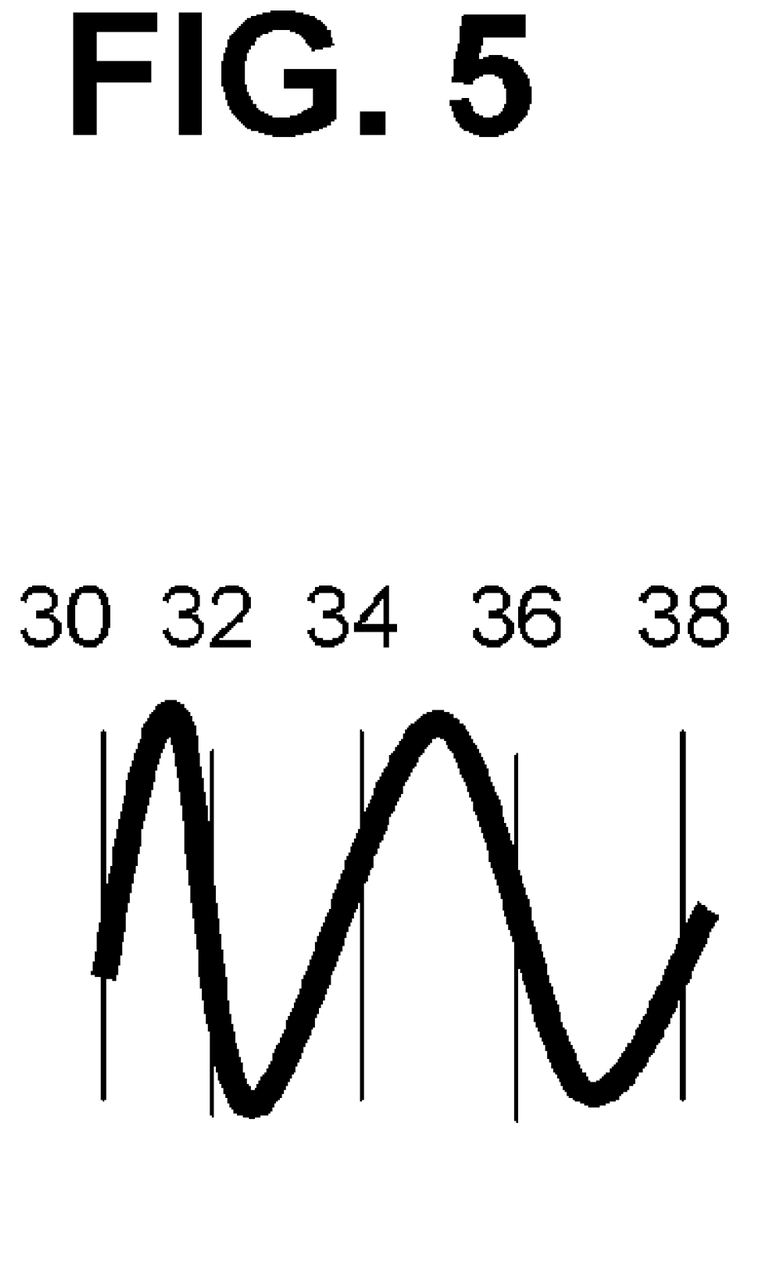
FIG. 5 is a diagrammatic representation of an output signal together with a plurality of vertical lines identifying the zero crossing points of the output signal and thereby visually displaying by the space between adjacent vertical lines the time intervals between zero crossing points of the output signal.

The present invention includes the step of collecting the width of the output signal by measuring the time interval between zero-crossing points. The sampling frequency is twice of the average of the frequency of the output signal. This follows because a zero crossing point criteria inherently divide a cycle of a signal into two parts. As illustrated in FIG. 5, the vertical lines 30, 32, 34, 36 and 38 intersect (and identify) the respective zero crossing points of the output signal. Thus, the first cycle is divided into a first width intermediate the vertical lines 30 and 32 and a second width intermediate the vertical lines 32 in 34. Similarly, a second successive cycle is divided into a third width intermediate the vertical lines 34 and 36 and a fourth width intermediate the vertical lines 36 and 38.

The following is an example of a still more detailed example of decoding DTMF tone having a Tone0.

The example will use the most popular algorithm, Fast Fourier Transform (Radix-2 Cooley-Tukey). The only requirement of FFT is that the number of points in the series be a power of two. (Many variations of DFT or FFT (Fast Fourier Transform) may be used to practice the present invention. Each is believed to be equally satisfactory.)

Step 1: Collecting the width of serial signals by measuring the time interval between zero-crossing points within 30 milliseconds. Assume the collection of 80 sets of width.

Step 2: $f=1/\lambda=1/(0.03 \text{ mS}/80*2) \approx 1333 \text{ Hz} = f_{high}$ (The high frequency of Tone0). (It will be understood that "0.03 mS" in this equation corresponds to the average width and "80*2" relates to the inherent characteristic of each sine wave having a first width and a second width because the sine wave intersects the zero value at the beginning of the wave, the middle of the wave and the end of the wave.

Step 3: Use the first 64 sets of serial data for Fast Fourier Transform computing. According to the requirement of Fast Fourier Transform is that the number of points in the series be a power of 2, we pick up 64 here.

Step 4: Here we got 80 sets of serial data within 30 milliseconds. This is equivalent to sampling an input signal at a 2666.6 Hz sampling frequency in a conventional way.

$f=1/\lambda=1/(0.03 \text{ mS}/80) \approx 2666.6 \text{ Hz}$ = The sample frequency in FFT computing.

Step 5: After FFT computing on 64 sets of input data, we get 64 sets of serial magnitude data.

Step 6: Identify which of the first 32 sets has the strongest magnitude. (Note: The 1st and 32nd sets will be mirror images of each other, the 2nd and 31st sets will be mirror images of each other, the 3rd and 30th sets will be mirror images of each other and this pattern continues throughout the entire group of 32 sets.) Assume, for the purpose of illustrating the method in accordance with the present invention, that they the $9^{th}$ set of serial data has the strongest magnitude.

$\Delta f$ (spacing frequency)$=(f_{sample}/64)=2666.6 \text{ Hz}/64=41.67 \text{ Hz}$ The strongest frequency$=\Delta f*9 \approx 375 \text{ Hz}=f_{high}-f_{low}$ (the difference between the two frequencies that compose the tone)

Step 7: Since $f_{high}$–flow=375 Hz (from Step 6) and $f_{high}$=1333 Hz (from Step 2)

$f_{low}$=1333 Hz–375 Hz=958 Hz (Note: The resolution of tone is 41.67 Hz)

Referring to the table in FIG. 4, we establish that the input signal is Tone0.

The method in accordance with the present invention may be utilized for a wide variety of applications and utilized within a wide variety of apparatus. One such application is a security system. The prior art includes a variety of security systems intended for homeowners, business owners, and other potential targets for burglary, that are monitored by a central station. These systems are vastly superior to older systems that merely sound a bell or alarm. They have also largely replaced systems that were tied in directly to the local police station. As the use of burglar alarms increased, the local police departments began turning down more and more requests to be "hooked-up." As a result, there became a demand for central stations, or companies whose specialty it was to simply monitor burglar alarms. Most police departments will still allow banks and large jewelry stores a direct link to the police station, but as a rule, homeowners are excluded. As the demand for security has risen, many guard agencies and burglar alarm installers have begun to offer centralized monitoring as an option for their clients.

When such systems are installed, it is common for them to be connected by a dedicated telephone line to the central station. Other systems utilize radio frequency and the internet to connect to the central station. In the event of an intrusion, the control panel (also known as a security panel) on the premises being monitored calls up the central station and gives an electronic message to the answering computer. It tells the computer exactly which switch or sensor has been violated, and the computer then tells the operator what has happened. For example if a burglar entered through a broken window, the panel would connect with the central station computer and tell it that zone 4, a first floor window, has been broken. The operator would then see on his computer screen that Acct. #1234, the Johnson residence, has had zone 4, the window foiling on the living room window, violated. As the thief progresses through the house, the panel would call the central station for every sensor that was violated. The operator may then receive 1234-17, meaning that zone 17, a passive Infra-Red detector in the master bedroom, has detected someone. In some cases pre-amplified microphones allow audio monitoring of the protected premises. The operator would then be fairly sure someone was in the house, so the operator would have three options. The operator may just send the companies guards to the scene, call 911 and dispatch the police, or he may send both the police and the guards.

Figure 6:
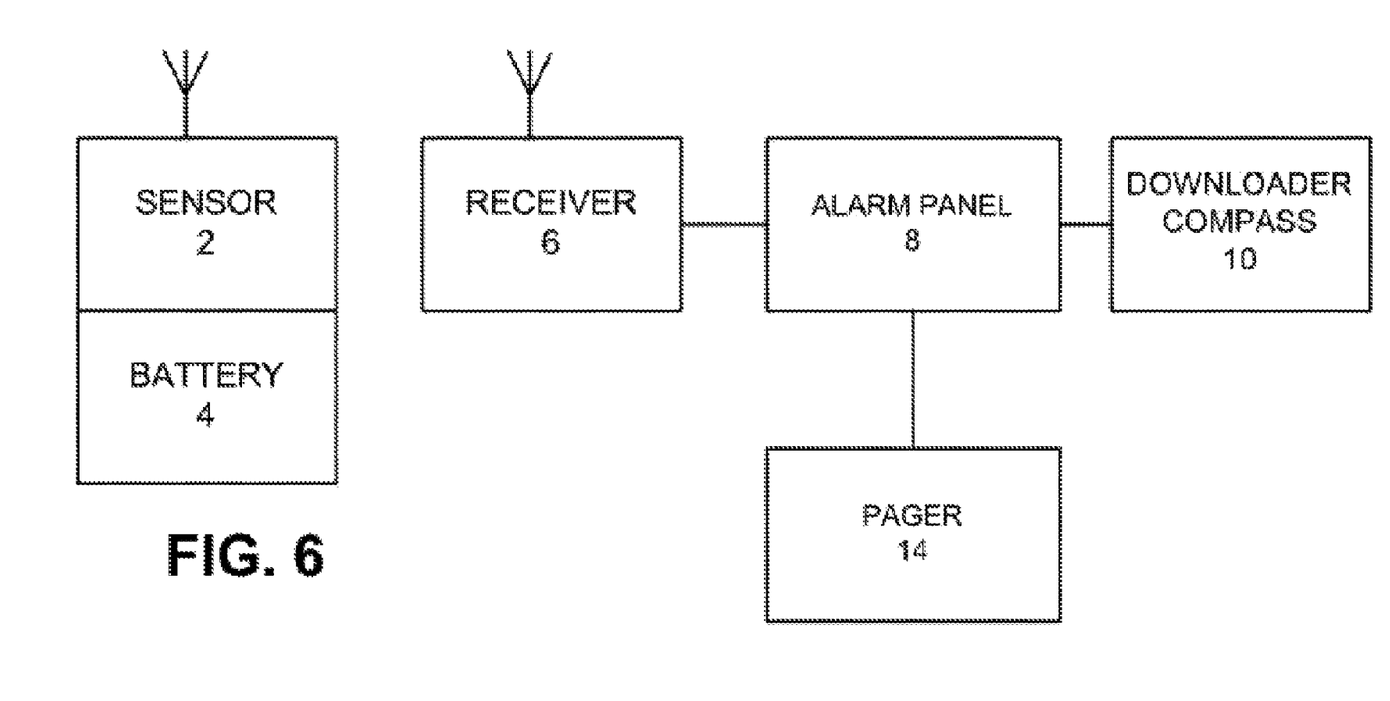
FIG. 6 is a diagrammatic representation of a security system incorporating the present invention.

The present invention may be utilized in security systems that include wireless connections between the control panel and the individual sensors as well as systems having wired connections between the sensors and the control panel. Referring now to FIG. 6, there is shown a conventional sensor, such as a passive infrared (PIR) sensor 2 coupled to a battery 4, that includes an internal transmitter and an antenna for transmitting a signal corresponding to the sensed parameter. Commercially available devices of this type are manufactured and sold by Honeywell and identified by the designation Ademco 5890 or 5894. Customarily the wireless sensor 2 is constructed and programmed to issue a signal at a predetermined interval to confirm the presence and operability of the sensor 2. For example, such a signal may be sent at an interval of once every hour to confirm to an alarm panel that the sensor has not been stolen or become inoperative.

The signal from the sensor 2 is transmitted to a receiver 6 that is configured to receive the signal from the sensor 2. Commercially available devices of this type are manufactured by Honeywell and are identified by the designation Ademco 5881. The receiver 6 is physically connected to an alarm panel 8. A commercially available alarm panel 8 for such an application is manufactured by Honeywell and identified by the designation VISTA 50.

Typically, the alarm panel 8 may be coupled by a phone line to a microcomputer running control software whereby the alarm panel 8 may be remotely controlled. One commercially available software program for such purposes is marketed by Honeywell and identified as the Ademco Compass Downloader 10. This software permits a user to remotely program and control an alarm system. It can simultaneously download from multiple workstations and can provide a complete account change/history. It provides a seamless DOS conversion and advanced error checking. There are multiple definable fields that can program and control any ADEMCO Group security system. Important features include permitting scheduled communication requests for the control panels. For example, the software may schedule a download of user codes to a customer at 2:00 AM, or schedule an event log update from a customer on Friday at midnight. The software also provides support for Fire Burglary Instruments (FBII) and Apex control panels. Some embodiments of the apparatus main utilize a pager 14 cooperating with the alarm panel 8.

The Ademco Compass Downloader for Windows Software provides a quick and easy method for planning, designing and communicating with the alarm panels. The user may do so from the comfort of an office and will allow the user to download and upload alarm control information, to compare the upload and saved information, and to view the results either on a screen or any printed report. The Compass Downloader enables programming from an office prior to installation. Alternatively, initial programming can be downloaded from a remote location or at a job site using a personal computer with a commercially available serial module such as the Honeywell/Ademco 4100SM (where the alarm panel supports it). The Compass change feature reviews all system changes initiated by the download operator within the current session. A complete record of system modifications and the history of an account are also available.

Such security systems include an alarm or control panel 8 that includes a microprocessor and cooperating memory coupled by an appropriate data bus. The present invention may be implemented by providing software to achieve the objects of the present invention. While it is the preferred embodiment of the present invention to implement the objects thereof with software, those skilled in the art will recognize that the various logical steps could also be achieved with hardware. The construction of such hardware, upon of exposure to the teachings of the present application, will be obvious to those skilled in the art. The respective methods and systems in accordance with the present system may utilize any system that includes a microprocessor and memory and which cooperates with software that is commercially available or within the skill of practitioners in the programming field. It will be appreciated that the systems and methods of the present invention are described with reference to block diagram illustrations. It should be understood that blocks of the block diagrams and illustrations, and combinations of blocks in the block diagrams and illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified herein. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein.

Accordingly, blocks of the block diagrams and illustrations support combinations of means for performing the specified functions, combinations of steps for performing the specified functions and program instruction means for performing the specified functions. It will also be understood that each block of the block diagrams and illustrations, and combinations of blocks in the block diagrams and illustrations, can be implemented by special purpose hardware-based computer systems that perform the specified functions or steps, or combinations of special purpose hardware and computer instructions.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. The method for decoding a DTMF tone which comprises:
    collecting the width of serial signals by measuring the time interval between zero-crossing points within a predetermined time;
    counting within said predetermined time the number of signal zero-crossing points;
    performing interpolation on the data produced by the collecting and counting steps with a Fourier transform;
    identifying a first frequency that has the strongest magnitude from the resulting data; and
    calculating the lower frequency of the tone being decoded by subtracting the first frequency from the average frequency of the digitized signal.

2. The method as described in claim 1 wherein the collecting and counting steps utilize a zero crossing detector to produce a digitized signal.

3. The method as described in claim 2 wherein the performing interpolation step is performed on the digitized signal from a zero crossing detector.

4. The method as described in claim 1 that further includes sampling at a rate greater than twice the frequency of the highest frequency component of the signal.

5. The method as described in claim 1 that includes providing a zero crossing detector to identify the zero crossing point of an output.

6. The method as described in claim 1 that includes providing a zero crossing detector to identify a zero crossing point of an output and this method step includes providing a detector that includes a comparator.

7. The method as described in claim 1 further including the step of utilizing the decoded DTMF tone to operate a security system.

8. The method is described in claim 1 further including the step of utilizing the decoded DTMF tone to control a security system.

9. Apparatus for decoding a DTMF tone which comprises:
    a zero-crossing detector for receiving a DTMF tone to be decoded and producing a digitized output;
    means for collecting the width of serial signals by measuring the time interval between zero-crossing points within a predetermined time;
    means for counting within said predetermined time the number of signal zero-crossing points;
    means for performing interpolation on the data produced by the collecting and counting steps with a Fourier transform;
    means for identifying a first frequency that has the strongest magnitude from the resulting data; and
    means for calculating the lower frequency of the tone being decoded by subtracting the first frequency from the average frequency of the digitized signal.

10. The apparatus as described in claim 9 that further includes means for sampling at a rate greater than twice the frequency of the highest frequency component of the signal.

11. The apparatus as described in claim 9 wherein said zero crossing point detector includes a comparator.

12. The apparatus as described in claim 9 wherein said apparatus is part of a security system.

13. The apparatus as described in claim 9 wherein said apparatus is a part of an alarm panel in a security system.

14. The apparatus as described in claim 13 wherein said apparatus is used to control the security system in response to DTMF inputs directed to the security system.

15. The apparatus as described in claim 9 wherein said means for collecting and said means for counting includes:
    a microprocessor;
    memory;
    a data bus connecting said memory and said microprocessor;
    means coupling the output of said zero crossing detector to said microprocessor.

16. The apparatus as described in claim 9 wherein said means for performing interpolation includes a microprocessor.

* * * * *

UNITED STATES PATENT AND TRADEMARK OFFICE
CERTIFICATE OF CORRECTION

PATENT NO. : 7,602,902 B2 Page 1 of 1
APPLICATION NO. : 11/163332
DATED : October 13, 2009
INVENTOR(S) : Hong-Jyh Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this

Fifth Day of October, 2010

David J. Kappos
*Director of the United States Patent and Trademark Office*